United States Patent [19]

Brown

[11] 4,165,920
[45] Aug. 28, 1979

[54] ECHO REDUCTION IMPROVEMENT IN A FRONT FACE GLARE REDUCTION OVERLAY

[75] Inventor: John W. Brown, Flemington, N.J.

[73] Assignee: Qantix Corporation, Flemington, N.J.

[21] Appl. No.: 819,561

[22] Filed: Jul. 27, 1977

[51] Int. Cl.² ............................................ G02B 27/00
[52] U.S. Cl. .................................. 350/276 R; 350/127
[58] Field of Search ............... 350/276, 179, 188, 127, 350/168, 92, 14, 26, 199, 299, 264, 129, 211, 175; 313/478, 479; 35/252-253

[56] References Cited

U.S. PATENT DOCUMENTS

| 2,909,770 | 10/1959 | Pugsley | 350/276 R |
| 3,279,340 | 10/1966 | Ramberg et al. | 350/205 |
| 4,012,115 | 3/1977 | Brown | 350/106 |

Primary Examiner—John K. Corbin
Assistant Examiner—B. Wm. de los Reyes
Attorney, Agent, or Firm—Lerner, David, Littenberg & Samuel

[57] ABSTRACT

An overlay for use on a transmission screen is disclosed which reduces front face glare by providing a plurality of inclined surfaces on the front surface thereof to deflect ambient light away from the viewing area. A coating of opaque material is applied to the peaks of the inclined surfaces to substantially eliminate "echos" of the image being viewed.

10 Claims, 4 Drawing Figures

ECHO REDUCTION IMPROVEMENT IN A FRONT FACE GLARE REDUCTION OVERLAY

BACKGROUND OF THE INVENTION

This invention relates to transmission screens for displays and, more particularly, to an overlay for reducing front face glare due to ambient light and, still more particularly, to an improvement thereof for substantially eliminating echo images.

In my copending U.S. patent application Ser. No. 716,237, filed Aug. 20, 1976, and entitled "An Overlay for the Viewing Surface of a Television Screen to Reduce Front Face Glare", I disclose an overlay for the viewing surface of a television screen which reduces front face glare by providing a plurality of inclined surfaces on the front surface thereof to deflect ambient light away from the viewing area. Such structure is also particularly useful for instrumentation displays, such as, for example, those utilized in airplane cockpits. It has been found, however, that when utilizing such an overlay, the problem of echos, or ghost-images, is created.

It is therefore an object of the present invention to provide a front face glare reducing overlay.

It is another object of the present invention to provide such an overlay without the generation of echos, or ghost images.

SUMMARY OF THE INVENTION

The foregoing and additional objects are attained in accordance with the principles of this invention in a front face overlay for a transmission screen having a plurality of inclined surfaces on the front face thereof, by coating the peaks of the inclined surfaces of such overlay with an opaque material.

DESCRIPTION OF THE DRAWING

The foregoing will be more readily apparent from reading the following description in conjunction with the drawing in which.

DESCRIPTION OF THE PREFERRED EMBODIMENT

Figure 1:
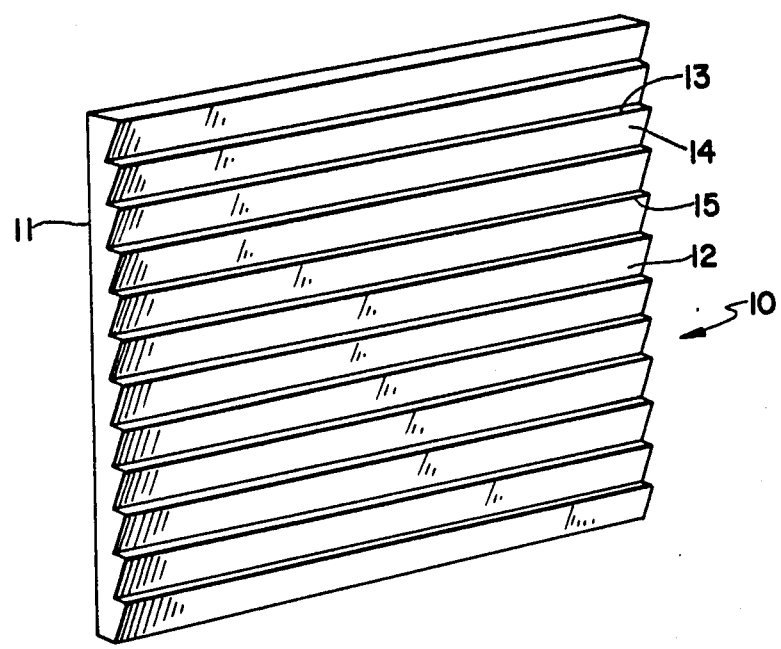
FIG. 1 is a perspective view of an overlay constructed in accordance with the principles disclosed in the above-referenced copending application.

Referring now to FIG. 1, depicted therein is a perspective view of an overlay to which the principles of this invention may be applied. The overlay is of the type disclosed in the above-referenced copending application and comprises a transparent sheet of material 10 having a substantially planar back surface 11 and a front surface 12. The front surface 12 is a composite surface formed by a plurality of surface elements 13 and 14. The surface elements designated 14 incline upwardly while the surface elements designated 13 are substantially perpendicular to the planar back surface 11. Surfaces 13 and 14 meet to form a plurality of peaks 15. The overlay shown in FIG. 1 deflects ambient light downwardly from surfaces 14 away from the viewing area without substantially affecting the viewing of an image from behind the overlay. However, echo images are created.

Figure 2:
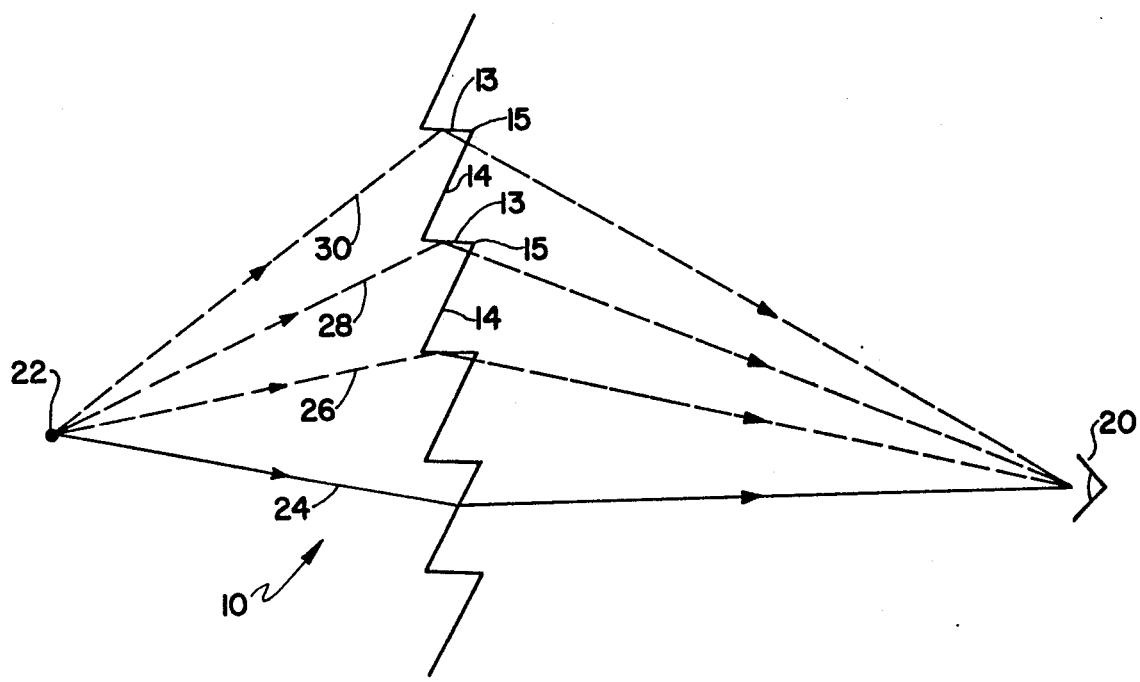
FIG. 2 is a side view of the overlay of FIG. 1 schematically depicting the generation of echo images.

Referring now to FIG. 2, depicted therein is the manner in which the echo images are formed. Typically, with the overlay 10 in a substantially vertical orientation, the eye 20 of the viewer is directed in a substantially horizontal direction toward an image of object 22. With such an arrangement, object 22 is viewed via desired light ray 24. However, light rays 26, 28, and 30 emanating from object 22 are reflected off surfaces 13 and thence are directed toward eye 20, thereby forming a plurality of echo images.

Figure 3:
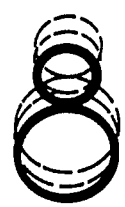
FIG. 3 depicts an illustrative image as viewed through the overlay of FIG. 1 showing echo images thereof.

FIG. 3 depicts a desired image of the numeral 8 shown in solid lines with a plurality of echo images thereof shown in dotted lines, and extending upwardly therefrom, these echo images being formed as shown in FIG. 2.

Figure 4:
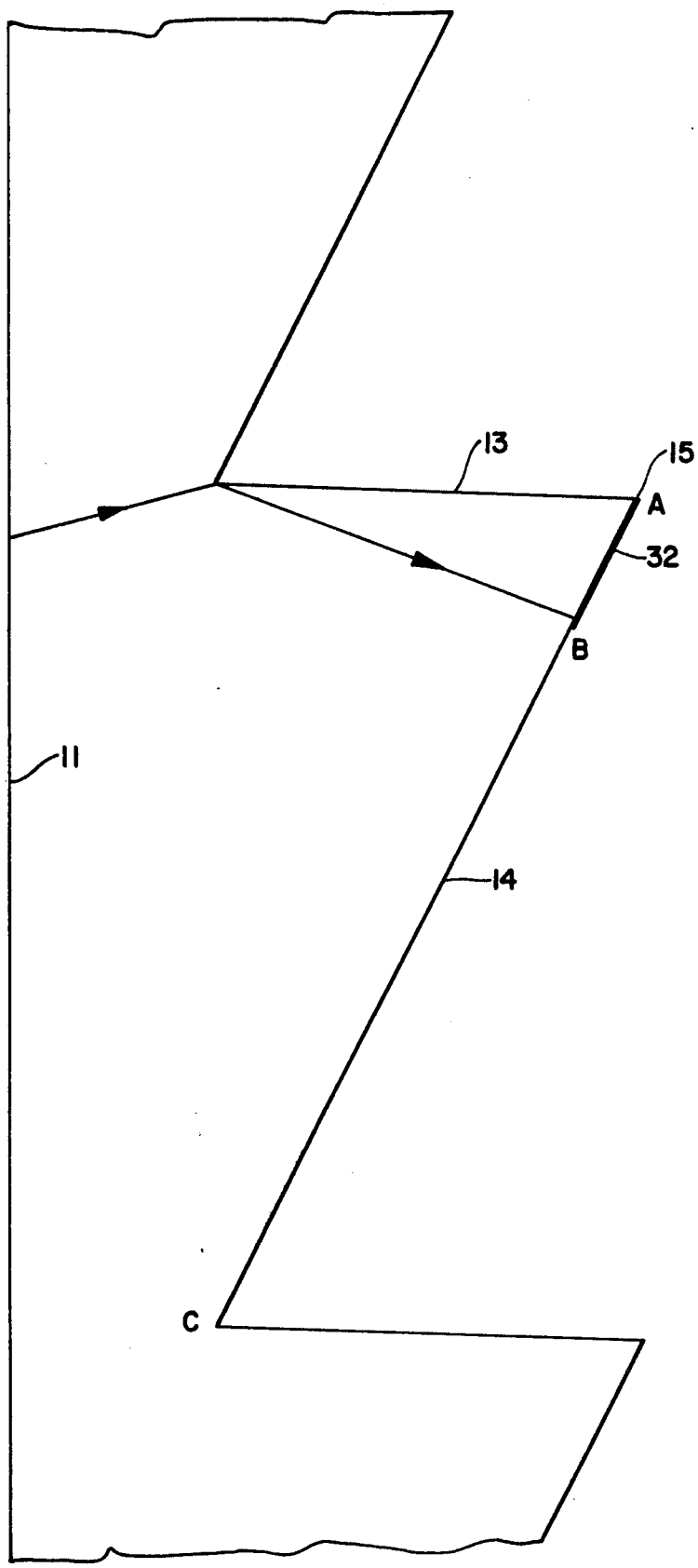
FIG. 4 is an enlarged side view of the overlay shown in FIG. 1 including the improvement according to the principles of this invention and illustrating the manner in which the echo images are eliminated by such improvement.

Referring to FIG. 4, depicted therein is an enlarged view of the improved screen in accordance with the principles of this invention. To eliminate the problem of echo images, in accordance with the principles of this invention, segment AB of surface 14 is coated with an opaque material 32. The length of segment AB is determined by the lowest desired viewing angle of the eye and the particular angular configuration chosen for the inclined surfaces 13 and 14. In a preferred embodiment, surface 14 is inclined approximately 30° from the vertical and surface 13 is inclined approximately 6° from the horizontal. (The inclination of surface 13 is to facilitate removal of the screen from its mold.) Choosing 20° below the horizontal as the lowest viewing position of the eye, the length of segment AB is approximately 15 percent of the length of segment AC, the total length of surface 14.

Therefore, in accordance with the embodiment shown in FIG. 4, if the viewing position of the eye is above 20° below horizontal, no echo images will be seen. If the eye is lower than 20° below the horizontal, echo images will be seen. If it is desired to extend the viewing angle to lower than 20° below the horizontal, the length of the coated segment AB would have to be increased.

The coating material 32 may be any desired opaque material such as, for example, black printers ink. Material 32 must be such that it will adhere to the material of which the screen 10 is comprised. Coating material 32 may be applied, for example, by the use of a roller or, alternatively, by dipping the screen 10 into a supply of the coating material 32.

While this invention has been described with respect to a preferred embodiment thereof, it is understood that many variations, modifications, and the like will be apparent to those skilled in the art to which this invention pertains, and this invention is intended to be limited only by the appended claims.

What is claimed is:

1. An overlay for use on a transmission screen to reduce reflection due to ambient light by directing the major portion of reflections from the viewing surface away from a desired viewing area, said overlay comprising a sheet of transparent material having a substantially planar back surface and a front surface including a first plurality of surfaces substantially perpendicular to said back surface and a second plurality of surfaces inclined outwardly with respect to said back surface, said first and second plurality of surfaces meeting at a respective plurality of peaks, and said desired viewing area being in front of said overlay, wherein the improvement comprises:

a coating of opaque material on said second plurality of surfaces, said coating extending from said peaks a sufficient distance along said surfaces of said second plurality to block the transmission of echo images emanating from an object behind said front surface to said desired viewing area.

2. An overlay according to claim 1, wherein said overlay is integral with said transmission screen.

3. An overlay according to claim 1, wherein said coating extends to cover approximately 15 percent of the area of said second plurality of surfaces.

4. An overlay according to claim 3, wherein said opaque material is printers ink.

5. An overlay according to claim 1, wherein said opaque material is printers ink.

6. A method for reducing the transmission of echo images to a desired viewing area from a front face glare reduction overlay which comprises a sheet of transparent material having a substantially planar back surface, and a front surface including a first plurality of surfaces substantially perpendicular to said back surface and a second plurality of surfaces inclined outwardly with respect to said back surface, said first and second plurality of surfaces meeting at a respective plurality of peaks, and said desired viewing area being in front of said overlay, said method comprising the step of:

coating said second plurality of surfaces with an opaque material so that said opaque material extends from said peaks along said surfaces of said second plurality a sufficient distance to block the transmission of echo images emanating from an object behind said front surface to said desired viewing area.

7. A method according to claim 6, wherein said overlay is made integral with a transmission screen.

8. An overlay according to claim 6, wherein said step of coating said second plurality of surfaces with an opaque material comprises coating approximately 15 percent of the area of said second plurality of surfaces.

9. An overlay according to claim 8, wherein said opaque material is printers ink.

10. An overlay according to claim 6, wherein said opaque material is printers ink.

* * * * *